(12) United States Patent
Hwang et al.

(10) Patent No.: US 9,517,688 B2
(45) Date of Patent: Dec. 13, 2016

(54) POWER TRANSMISSION SYSTEM OF HYBRID ELECTRIC VEHICLE

(71) Applicant: Hyundai Motor Company, Seoul (KR)

(72) Inventors: Donghwan Hwang, Seoul (KR); Changwook Lee, Suwon-si (KR); Jongsool Park, Hwaseong-si (KR); Horim Yang, Yongin-si (KR); Wonmin Cho, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/559,842

(22) Filed: Dec. 3, 2014

(65) Prior Publication Data
US 2016/0033015 A1 Feb. 4, 2016

(30) Foreign Application Priority Data
Jul. 30, 2014 (KR) .................. 10-2014-0097364

(51) Int. Cl.
| | |
|---|---|
| *B60K 6/365* | (2007.10) |
| *B60K 6/445* | (2007.10) |
| *B60K 6/547* | (2007.10) |
| *F16H 3/72* | (2006.01) |
| *F16H 3/66* | (2006.01) |

(52) U.S. Cl.
CPC .............. *B60K 6/365* (2013.01); *B60K 6/445* (2013.01); *B60K 6/547* (2013.01); *F16H 3/728* (2013.01); *F16H 3/666* (2013.01); *F16H 2200/201* (2013.01); *F16H 2200/2038* (2013.01); *F16H 2200/2097* (2013.01); *Y02T 10/6239* (2013.01); *Y10S 903/919* (2013.01)

(58) Field of Classification Search
None
See application file for complete search history.

(56) References Cited

U.S. PATENT DOCUMENTS

| 8,226,515 B2 | 7/2012 | Phillips | |
|---|---|---|---|
| 2006/0189427 A1* | 8/2006 | Raghavan | B60K 6/365 475/5 |
| 2007/0042858 A1* | 2/2007 | Raghavan | B60K 6/40 475/276 |
| 2007/0219036 A1* | 9/2007 | Bucknor | B60K 6/40 475/5 |

FOREIGN PATENT DOCUMENTS

| JP | 2013-1385 A | 1/2013 |
|---|---|---|
| KR | 10-1144418 B1 | 5/2012 |
| KR | 10-2014-0080636 A | 7/2014 |

* cited by examiner

*Primary Examiner* — Colby M Hansen
(74) *Attorney, Agent, or Firm* — Morgan, Lewis & Bockius LLP

(57) ABSTRACT

A power transmission system of a hybrid electric vehicle may include an input shaft, an output shaft, a first planetary gear set having three rotation elements, a second planetary gear set having three rotation elements, a third planetary gear set, a first shaft, a second shaft, a third shaft, a fourth shaft, a fifth shaft, a sixth shaft, and a seventh rotational shaft such that the power transmission system can suppress conversion to an Engine (ENG) mode by providing sufficient power performance at the time of wide open throttle (WOT) launching and maximally use power of an engine at the time of conversion to a first Hybrid-Electric Vehicle (HEV) mode and a third HEV mode.

12 Claims, 7 Drawing Sheets

FIG. 2

| Mode | Transmission step | Friction element | | |
|---|---|---|---|---|
| | | BK1 | CL1 | CL2 |
| EV | 1ST | ● | | |
| | 2ND | | ● | |
| HEV | 1ST | ● | | |
| | 2ND | | ● | |
| | 3RD | | | ● |
| ENG | 1ST | ● | | ● |
| | 2ND | | ● | ● |

POWER TRANSMISSION SYSTEM OF HYBRID ELECTRIC VEHICLE

CROSS-REFERENCE TO RELATED APPLICATION

The present application claims priority to and the benefit of Korean Patent Application No. 10-2014-0097364 filed on Jul. 30, 2014, the entire contents of which is incorporated herein for all purposes by this reference.

BACKGROUND OF THE INVENTION

Field of the Invention

The present invention relates to a power transmission system of a hybrid electric vehicle, and more particularly, to a power transmission system of a hybrid electric vehicle that can suppress conversion to an Engine (ENG) mode by providing sufficient power performance at the time of wide open throttle (WOT) launching and maximally use power of an engine at the time of conversion to a first Hybrid-Electric Vehicle (HEV) mode and a third HEV mode.

Description of Related Art

Eco-friendly technology of a vehicle is a core technology influencing survival of a future vehicle industry and advanced vehicle makers devote all their might to developing eco-friendly vehicles for meeting environmental and fuel efficiency regulations.

As a result, the respective vehicle makers have developed an electric vehicle (EV), a hybrid electric vehicle (HEV), a fuel cell electric vehicle (FCEV), and the like as a future vehicle technology.

Since the future vehicle has various technological restrictions such as a weight and cost, the vehicle makers have paid attention to the hybrid electric vehicle as an alternative of a realistic problem for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes and a gasoline engine or a diesel engine using the existing fossil fuel and a motor/generator driven by electric energy are mixed and used as the power sources.

In the hybrid electric vehicle, an EV mode in which the hybrid electric vehicle is driven by only the motor, an HEV mode using both the engine and the motor, and an ENG mode using only the engine can be implemented according to the combination of the engine and the motor.

Further, the hybrid electric vehicle can acquire a significant fuel efficiency enhancement effect as compared with the existing vehicle through idle stop of stopping the engine when the vehicle stops, fuel saving by regenerative braking that drives a generator by using kinetic energy of the vehicle instead of braking by the existing friction when the vehicle is braked, and stores in a battery electric energy generated at the time of driving the generator and reuses the stored electric energy when driving the vehicle, and the like.

A power transmission system of the hybrid electric vehicle is classified into a single-mode scheme and a multiple-mode scheme.

The single-mode scheme has an advantage that torque transmission mechanisms such as a clutch and a brake for transmission control are not required, but disadvantages that when the vehicle travels at a high speed, efficiency deteriorates, and as a result, the fuel efficiency is low and an additional torque increasing device is required to apply the single-mode scheme to large-sized vehicles.

The multiple mode scheme has advantages that when the vehicle is driven at the high speed, the efficiency is high and torque can be designed to increase, and as a result, the multiple-mode scheme can be applied to large and medium-sized vehicles.

As a result, in recent years, the multiple-mode scheme has primarily been adopted rather than the single-mode scheme and the resulting research has actively progressed.

The multiple-mode scheme power transmission system is configured to include a plurality of planetary gear sets, a plurality of motors/generators used as the motor and the generator, a plurality of torque transmission mechanisms (friction elements) capable of controlling rotating elements of the planetary gear sets, a battery used as power sources of the motors/generators, and the like.

The multiple-mode scheme power transmission system has different operating mechanisms according to connection configurations of the planetary gear sets, the motors/generators, and the torque transmission mechanisms.

In addition, since the multiple-mode scheme power transmission system has characteristics that durability, power transmission efficiency, a size, and the like vary according to the connection configurations, research and development for implementing a power transmission system which is stronger, has no power loss, and is compact has been continued in a power transmission system of a hybrid electric vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission system of a hybrid electric vehicle that can suppress conversion to an Engine (ENG) mode by providing sufficient power performance at the time of wide open throttle (WOT) launching and maximally use power of an engine at the time of conversion to a first Hybrid-Electric Vehicle (HEV) mode and a third HEV mode.

The present invention has also been made in an effort to provide a power transmission system of a hybrid electric vehicle that decreases an electric load by increasing a weight of a mechanical power transmission path to allow large engine power to be used, substitutes an ENG mode at the time of launching to decrease the number of mode conversion times, and minimizes a change in RPM of all rotating elements at the time of mode conversion.

The present invention has also been made in an effort to provide a power transmission system of a hybrid electric vehicle that can provide an ENG mode in which the vehicle can be driven without the electric load of a motor/generator for improving fuel efficiency at the time of high-speed driving.

An aspect of the present invention provides a power transmission system of a hybrid electric vehicle including an input shaft into which power of an engine is input, an output shaft outputting transmitted rotational power through an output gear, a first planetary gear set having three rotation elements constituted by a first sun gear, a first planetary carrier, and a first ring gear and disposed on the output shaft, a second planetary gear set having three rotation elements constituted by a second sun gear, a second planetary carrier, and a second ring gear and disposed at a rear side of the first planetary gear set, a third planetary gear set having three rotation elements constituted by a third sun gear, a third planetary carrier, and a third ring gear and disposed at a rear side of the second planetary gear set, a first rotational shaft directly connected with a first motor/generator while directly connecting one rotation element among the rotation elements of the first planetary gear set and one rotation element among the rotation elements of the second planetary gear set, a second rotational shaft directly connected with the output shaft while directly connecting one rotation element of the first planetary gear set excepted from the rotation elements constituting the first rotational shaft and one rotation element among the rotation elements of the third planetary gear set, a third rotational shaft directly connecting one rotation element of the first planetary gear set excepted from the rotation elements constituting the first and second rotational shafts and the input shaft, a fourth rotational shaft directly connecting one rotation element of the second planetary gear set excepted from the rotation elements constituting the first rotational shaft with a transmission housing, a fifth rotational shaft constituted by one rotation element of the second planetary gear set excepted from the rotation elements constituting the first and fourth rotational shafts, a sixth rotational shaft directly connecting one rotation element of the third planetary gear set excepted from the rotation elements constituting the second rotational shaft and a second motor/generator, a seventh rotational shaft selectively connected with the transmission housing while selectively connecting one rotation element of the third planetary gear set excepted from the rotation elements constituting the second and sixth rotational shafts and the fifth rotational shaft, and three friction elements selectively connecting the rotational shafts to each other or selectively connecting the respective rotational shafts to the transmission housing.

Each of all of the first, second, and third planetary gear sets may be configured by a single pinion planetary gear set and may have a first rotational shaft connected with the first motor/generator while directly connecting the first sun gear and the second ring gear, a second rotational shaft directly connecting the first planetary carrier and the third planetary carrier, a third rotational shaft connecting the first ring gear and the input shaft, a fourth rotational shaft connecting the second sun gear to the transmission housing, a fifth rotational shaft including the second planetary carrier, a sixth rotational shaft connecting the third sun gear to the second motor/generator, and a seventh rotational shaft including the third ring gear.

Each of the three friction elements may include a first brake selectively connecting the seventh rotational shaft with the transmission housing, a first clutch as a direct joining means of the third planetary gear set, which selectively connects the second rotational shaft with the seventh rotational shaft, and a second clutch selectively connecting the fifth rotational shaft with the seventh rotational shaft.

In the case of the first and second clutches, and the first brake, in EV mode 1, the first brake may operate, in EV mode 2, the first clutch may operate, in HEV mode 1, the first brake may operate, in HEV mode 2, the first clutch may operate, in HEV mode 3, the second clutch may operate, in ENG mode 1, the first brake and the second clutch may operate, and in ENG mode 2, the first and second clutches may operate.

Each of the three friction elements may include a first brake selectively connecting the seventh rotational shaft with the transmission housing, a first clutch as the direct joining means of the third planetary gear set, which selectively connects the sixth rotational shaft with the seventh rotational shaft, and a second clutch selectively connecting the fifth rotational shaft with the seventh rotational shaft.

Each of the three friction elements may include a first brake selectively connecting the seventh rotational shaft with the transmission housing, a first clutch as the direct joining means of the third planetary gear set, which selectively connects the second rotational shaft with the sixth rotational shaft, and a second clutch selectively connecting the fifth rotational shaft with the seventh rotational shaft.

The first planetary gear set may be configured by a double pinion planetary gear set, and each of the second and third planetary gear sets is configured by the single pinion planetary gear set and may have a first rotational shaft connected with the first motor/generator while directly connecting the first sun gear and the second ring gear, a second rotational shaft directly connecting the first ring gear and the third planetary carrier, a third rotational shaft connecting the first planetary carrier and the input shaft, a fourth rotational shaft connecting the second sun gear to the transmission housing, a fifth rotational shaft including the second planetary carrier, a sixth rotational shaft connecting the third sun gear to the second motor/generator, and a seventh rotational shaft including the third ring gear.

Each of the first and third planetary gear sets may be configured by the single pinion planetary gear set, and the second planetary gear set is configured by a double pinion planetary gear set and may have a first rotational shaft connected with the first motor/generator while directly connecting the first sun gear and the second planetary carrier, a second rotational shaft directly connecting the first planetary carrier and the third planetary carrier, a third rotational shaft connecting the first ring gear and the input shaft, a fourth rotational shaft connecting the second sun gear to the transmission housing, a fifth rotational shaft including the second ring gear, a sixth rotational shaft connecting the third sun gear to the second motor/generator, and a seventh rotational shaft including the third ring gear.

Each of the first and second planetary gear sets may be configured by the single pinion planetary gear set, and the third planetary gear set is configured by the double pinion planetary gear set and may have a first rotational shaft connected with the first motor/generator while directly connecting the first sun gear and the second ring gear, a second rotational shaft directly connecting the first planetary carrier and the third ring gear, a third rotational shaft connecting the first ring gear and the input shaft, a fourth rotational shaft connecting the second sun gear to the transmission housing, a fifth rotational shaft including the second planetary carrier, a sixth rotational shaft connecting the third sun gear to the second motor/generator, and a seventh rotational shaft including the third planetary carrier.

According to an exemplary embodiment of the present invention, in an overall configuration, two EV modes, three HEV modes, and two ENG modes can be implemented in a combination of three planetary gear sets, three friction elements, and two motors/generators.

Further, a weight of a mechanical power transmission path can be increased by transmitting larger torque than engine torque to an output shaft and power of a larger engine than the same specification of a first motor/generator can be used.

Since the larger torque than the engine torque can be transmitted to the output shaft, high-rotation driving having high engine power at the same vehicle speed is enabled at the time of WOT launching and a larger acceleration force can be achieved.

In addition, since the larger acceleration force can be achieved in the HEV mode than the ENG mode, the HEV mode need not be converted into the ENG mode at the time of launching, and as a result, a relatively simple system can be configured and friction elements can be reduced depending on mode reduction, thereby further increasing efficiency.

The vehicle can be driven without electric loads of first and second motor/generators by providing the ENG mode at the time of the high-speed driving to improve fuel efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of operation modes of friction elements applied to the power transmission system according to the various exemplary embodiments of the present invention.

Figure 1:
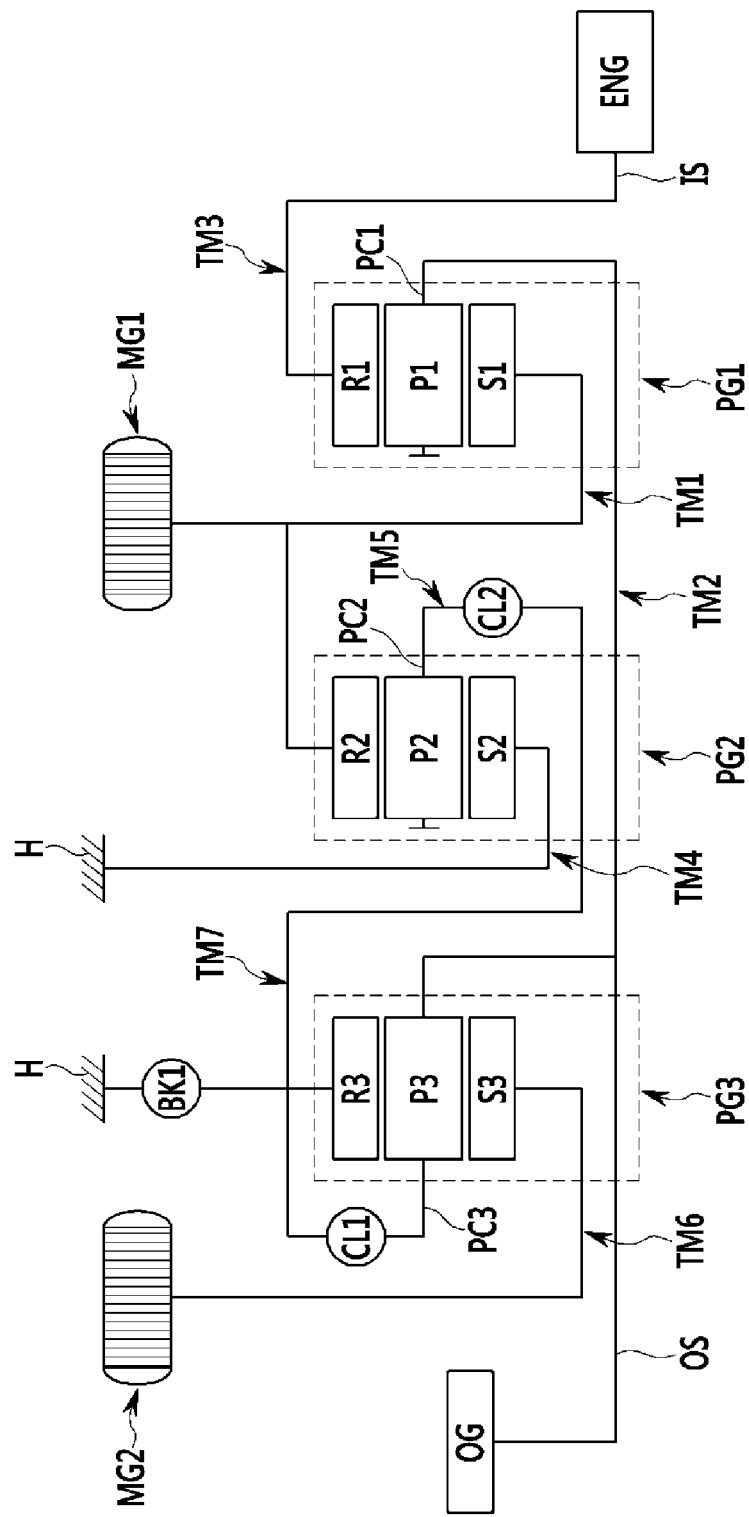
FIG. 1 is a configuration diagram of a power transmission system according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

However, parts which are not related with the description are omitted for clearly describing the exemplary embodiment of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a configuration diagram of a power transmission system according to a first exemplary embodiment of the present invention.

Referring to FIG. 1, the power transmission system according to the exemplary embodiment of the present invention is configured in a combination of first, second, and third planetary gear sets PG1, PG2, and PG3, first and second motors/generators MG1 and MG2, and three friction elements BK1, CL1, and CL2.

The first planetary gear set PG1 as a single pinion planetary gear set includes a first sun gear S1, a first ring gear R1, and a first planetary carrier PC1 that rotatably supports a plurality of first pinions P1 which outer-engage with each other between the first sun gear S1 and the first ring gear R1.

The second planetary gear set PG2 as the single pinion planetary gear set includes a second sun gear S2, a second ring gear R2, and a second planetary carrier PC2 that rotatably supports a plurality of second pinions P2 which outer-engage with each other between the second sun gear S2 and the second ring gear R2.

The third planetary gear set PG3 as the single pinion planetary gear set includes a third sun gear S3, a third ring gear R3, and a third planetary carrier PC3 that rotatably supports a plurality of third pinions P3 which outer-engage with each other between the third sun gear S3 and the third ring gear R3.

The first, second, and third planetary gear sets PG1, PG2, and PG3 are sequentially disposed on an output shaft OS from an engine ENG and have seven rotational shafts TM1 to TM7 while respective rotating elements are directly joined or selectively connected to each other.

In more detail, the first, second, and third planetary gear sets PG1, PG2, and PG3 have the seven rotational shafts TM1 to TM7 while the first sun gear S1 of the first planetary gear set PG1 is directly connected with the second ring gear R2 of the second planetary gear set PG2, the second planetary carrier PC2 of the second planetary gear set PG2 is selectively connected with the third ring gear R3 of the third planetary gear set PG3, and the third planetary carrier PC3 of the third planetary gear set PG3 is directly connected with the first planetary carrier PC1 of the first planetary gear set PG1.

The first rotational shaft TM1 is configured by connecting the first sun gear S1 and the second ring gear R2 and directly connected with the first motor/generator MG1.

The second rotational shaft TM2 is configured by connecting the first planetary carrier PC1 and the third planetary carrier PC3, and directly connected with the output shaft OS to continuously operate as an output element.

The third rotational shaft TM3 includes the first ring gear R1, and is directly connected with an input shaft IS to continuously operate as an input element.

The fourth rotational shaft TM4 includes the second sun gear S2, and is directly connected with a transmission housing H to continuously operate as a fixation element.

The fifth rotational shaft TM5 includes the second planetary carrier PC2.

The sixth rotational shaft TM6 includes the third sun gear S3 and is directly connected with the second motor/generator MG2.

The seventh rotational shaft TM7 includes the third ring gear R3, and is selectively connected with the transmission housing H.

The first motor/generator MG1 and the second motor/generator MG2 as independent power sources have functions as the motor and the generator as described above.

The first motor/generator MG1 operates as a motor that is directly connected with the first rotational shaft TM1 to supply rotational power or serves as a generator that generates electricity while rotating by rotational force of the first rotational shaft TM1.

The second motor/generator MG2 operates as a motor that is directly connected with the sixth rotational shaft TM6 to supply rotational power or serves as a generator that generates electricity while rotating by rotational force of the sixth rotational shaft TM6.

The first brake BK1 among the friction elements is a friction element that selectively connects a rotation element and a fixation element (transmission housing), and the first and second clutches CL1 and CL2 as friction elements that selectively connect the rotation element and the fixation element may include multi-disk type hydraulic friction elements that are friction joined to each other by hydraulic pressure.

The first brake BK1 is disposed to selectively connect the third rotational shaft TM7 and the transmission housing H, and as a result, the seventh rotational shaft TM7 may selectively operate as the fixation element.

The first clutch CL1 connects three rotation elements of the third planetary gear set PG3 to each other by two rotational shafts of three rotational shafts TM2, TM6, and TM7 including three rotation elements of the third planetary gear set PG3 to allow the third planetary gear set PG3 to be directly joined and in the first exemplary embodiment based on FIG. 1, it is disclosed that the first clutch CL1 is disposed between the second rotational shaft TM2 and the seventh rotational shaft TM7 and the second clutch CL2 selectively connects the fifth rotational shaft TM5 and the seventh rotational shaft TM7.

In FIG. 1, it is disclosed that the engine ENG is disposed at a front side of the first planetary gear set PG1, but the present invention is not limited thereto and the engine ENG may be disposed at a rear side of the third planetary gear set PG3.

FIG. 2 is an operation table for each of operation modes of friction elements applied to the power transmission system according to the first exemplary embodiment of the present invention.

Referring to FIG. 2, operation states of the friction elements for each operation mode will be described below.

In Electric Vehicle (EV) mode 1, the first brake BK1 operates, in EV mode 2, the first clutch CL1 operates, in Hybrid-Electric Vehicle (HEV) mode 1, the first brake BK1 operates, in HEV mode 2, the first clutch CL1 operates, in HEV mode 3, the second clutch CL2 operates, in Engine (ENG) mode 1, the first brake BK1 and the second clutch CL2 operate, and in ENG mode 2, the first and second clutches CL1 and CL2 operate.

As described above, the power transmission system according to the first exemplary embodiment of the present invention may implement two EV modes, three HEV modes, and two ENG modes.

Hereinafter, an operation principle for each mode will be described below.

[EV Mode 1]

The EV mode is a mode that drives the vehicle with power of the motor/generator by supplying power of a battery to the motor/generator while the engine stops.

The EV mode exerts a large influence on fuel efficiency improvement because the engine stops, has an advantage that the vehicle may be driven backward without an additional backward device, operates at the time of starting and low-speed driving after stopping, and requires a deceleration transmission ratio in which a power source rotates more rapidly than an output member for slip-down prevention or rapid acceleration on a slope.

Under such a condition, in EV mode 1, the second motor/generator MG2 is operation-controlled while the seventh rotational shaft TM7 operates as the fixation element by operating the first brake BK1, and as a result, a deceleration output is performed according to a gear ratio of the third planetary gear set PG3 while an input in the sixth rotational shaft TM6 is performed.

[EV Mode 2]

The motor/generator has characteristics that the efficiency depends on a rotational speed and torque and this means that a ratio of the electric energy is converted into mechanical energy of rotation and torque varies even though the same current is supplied.

That is, current of the battery used in the EV mode is energy accumulated by combustion of fuel or regenerative braking in the engine and efficiently using the accumulated energy regardless of a generation path is directly linked with fuel efficiency improvement.

Due to such a reason, in recent years, there has been a tendency that a transmission having two or more steps is mounted even in an electric vehicle and since it is advantageous that two or more transmission steps are provided in the EV mode of the hybrid electric vehicle, EV mode 2 is provided even in the exemplary embodiment of the present invention.

When a transmission process of EV mode 2 is examined by considering such a point, a vehicle speed increases to cancel the operation of the first brake BK1 at a point in which the efficiency of the second motor/generator MG2 is low, and the first clutch CL1 is operation-controlled, during driving in EV mode 1 in EV mode 2.

Then, since the first clutch CL1 which is a direct joining means of the third planetary gear set PG3 operates, the third planetary gear set PG3 is in a direct joining state, and as a result, while the second, sixth, and seventh rotational shafts rotate at the same speed, the input is just output.

[HEV Mode 1]

In HEV mode 1, the power of the engine is transmitted to the output member through a mechanical path and an electric path, the power is distributed by the planetary gear set, and since the engine and the motor/generator connected to the planetary gear set may arbitrarily control the rotational speed regardless of the vehicle speed, the engine and the motor/generator serve as an electronic continuously variable transmission.

Accordingly, an engine speed and torque is fixed to with respect to a given vehicle speed in the existing transmission, while the electronic continuously variable transmission may arbitrarily change the engine speed and the torque, driving efficiency of the engine may be maximized and fuel efficiency improvement may be achieved.

By considering such a point, in EV mode 1, the second rotational shaft TM2 is restrained in connection with the output shaft OS and the residual first and third rotational shafts TM1 and TM3 are rotatable in the first planetary gear set PG1.

Therefore, after the engine ENG starts by using the first motor/generator MG1, the speeds of the engine ENG and the first motor/generator MG1 may be controlled regardless of the vehicle speed.

Further, since torque of the first motor/generator MG1 is applied clockwise regardless of the rotational direction, the sum of the torques of the engine ENG and the first motor/generator MG1 are transmitted to the output shaft to generate high drive power.

In addition, when the first motor/generator MG1 rotates counterclockwise, the first motor/generator MG1 serves as the generator, and when the first motor/generator MG1 rotates clockwise (of course, in this case, the rotation speed of the engine ENG is lower than before), the first motor/generator MG1 serves as the motor.

Since the engine ENG and the first motor/generator MG1 may be continuously variably controlled as necessary in HEV mode 1 (input branch), HEV mode 1 may show very excellent performance in terms of fuel efficiency and power performance.

[HEV Mode 2]

In an exemplary embodiment of the present invention, the input branch mode may be set as two types, a rotational speed ratio of the engine and the motor/generator to the vehicle speed may be, in overall, set as two types by changing a gear ratio of the second planetary gear set PG2, and a rotational speed level for each rotation element deteriorates in overall to assist the fuel efficiency improvement.

In EV mode 2, the second rotational shaft TM2 of the first planetary gear set PG1 is restrained in connection with the output shaft OS and the residual first and third rotational shafts TM1 and TM3 are rotatable.

Therefore, when the engine ENG and the first motor/generator MG1 are controlled, the speeds of the engine ENG and the first motor/generator MG1 may be continuously variably controlled regardless of the vehicle speed.

In addition, when the first motor/generator MG1 rotates counterclockwise, the first motor/generator MG1 serves as the generator, and when the first motor/generator MG1 rotates clockwise (of course, in this case, the rotation speed of the engine ENG is lower than before), the first motor/generator MG1 serves as the motor.

As such, since the engine ENG and the first motor/generator MG1 may be continuously variably controlled as necessary, EV mode 2 may show very excellent performance in terms of fuel efficiency and power performance.

[HEV Mode 3]

In an HEV input branch mode, the rotation speed of the motor/generator connected to the output member is restrained to the vehicle speed, and as a result, it is difficult to efficiently operate the motor/generator and decrease a capacity of the motor/generator.

In particular, when the vehicle speed is high and the rotation speed of the motor/generator restrained to the vehicle speed is thus high, the efficiency of the motor/generator deteriorates, and as a result, optimal fuel efficiency may not be implemented.

Under such a condition, when the first planetary gear set PG1 connected with the engine ENG and two different elements of the second planetary gear set PG2 connected with an output gear OG are joined to each other to control the rotational speeds of the engine ENG and two motors/generators MG1 and MG2 regardless of the vehicle speed, a function of the continuously variable transmission operates once again to achieve the fuel efficiency improvement.

As a result, when the second clutch CL2 operates, the speed and the torque of the second motor/generator MG2 is restrained by the speed and the torque of the engine ENG through the second planetary gear set PG2, and since the first planetary gear set PG1 and the third planetary gear set PG3 are connected to each other by the second rotational shaft TM2, the speeds and the torques are restrained from each other.

In addition, the first and second motors/generators MG1 and MG2 need to have an electric energy balance to each other, and while all rotation elements of the first and third planetary gear sets PG1 and PG3 are correlated to each other in terms of the speed and the torque, the function of the electronic continuously variable transmission is performed.

[ENG Mode 1]

Core technology for the fuel efficiency improvement of the hybrid electric vehicle may be recovery and reuse of regenerative energy and arbitrary control of an engine operation point.

In addition, the control of the engine operation point accompanies two energy conversion processes of a process in which the mechanical energy of the engine is converted into the electric energy in the motor/generator and a process in which the electric energy of the motor/generator is converted into the mechanical energy again in the motor/generator again.

During the energy conversion, total energy is not output, the loss is generated in the middle of the conversion, and under a predetermined driving condition, the fuel efficiency may be more excellent in the ENG mode in which the vehicle is driven by only the engine than the hybrid operation mode.

That is, in ENG mode 1, when the first brake BK1 and the second clutch CL2 are coupled to each other, the power of the engine ENG is transmitted to the output shaft OS through the second rotational shaft TM2 while the first rotational shaft TM1 stops and the seventh rotational shaft TM7 stops, the deceleration transmission ratio is formed.

In this case, since the power of the first and second motors/generators MG1 and MG2 is not required, the ENG mode in which the vehicle is driven by only the power of the engine is established.

[ENG Mode 2]

In ENG mode 2, when the first clutch CL1 and the second clutch CL2 are coupled to each other, all rotation elements of the third planetary gear set PG3 integrally rotate, and as a result, the seventh rotational shaft TM7 rotates at the same speed as the output and the second rotational shaft TM1 is accelerated to rotate according to a gear ratio of the second planetary gear set PG2.

Further, the first rotational shaft TM1 connected with the engine ENG rotates at a lower speed than the second rotational shaft TM2, and as a result, an acceleration transmission ratio is formed.

In this case, since the power of the first and second motors/generators MG1 and MG2 is not required, the ENG mode in which the vehicle is driven by only the power of the engine is established.

As described above, according to the first exemplary embodiment of the present invention, in an overall configuration, two EV modes, three HEV modes, and two ENG modes may be implemented in a combination of three planetary gear sets PG1, PG2, and PG3, three friction elements BK1, CL1, and CL2, and two motors/generators MG1 and MG2.

Further, in the first exemplary embodiment of the present invention, the power of the engine ENG is input into the first ring gear R1 of first planetary gear set and the power of the first motor/generator MG1 is input into the first sun gear S1, and as a result, torque which is larger than the torque of the engine ENG is transmitted to the output shaft OS to increase a weight of a mechanical power transmission path and use larger engine power for the same specification of the first motor/generator MG1.

Further, in the first exemplary embodiment of the present invention, since the larger torque than the engine torque may be transmitted to the output shaft, high-rotation driving having high engine power at the same vehicle speed is enabled at the time of WOT launching and a larger acceleration force may be achieved.

In addition, in the first exemplary embodiment of the present invention, since the larger acceleration force may be achieved in the HEV mode than the ENG mode, the HEV mode need not be converted into the ENG mode at the time of launching, and as a result, a relatively simple system may be configured and friction elements may be reduced depending on mode reduction, thereby further increasing efficiency.

The vehicle may be driven without the electric load of the first and second motor/generators by providing the ENG mode at the time of the high-speed driving to improve fuel efficiency.

Figure 3:
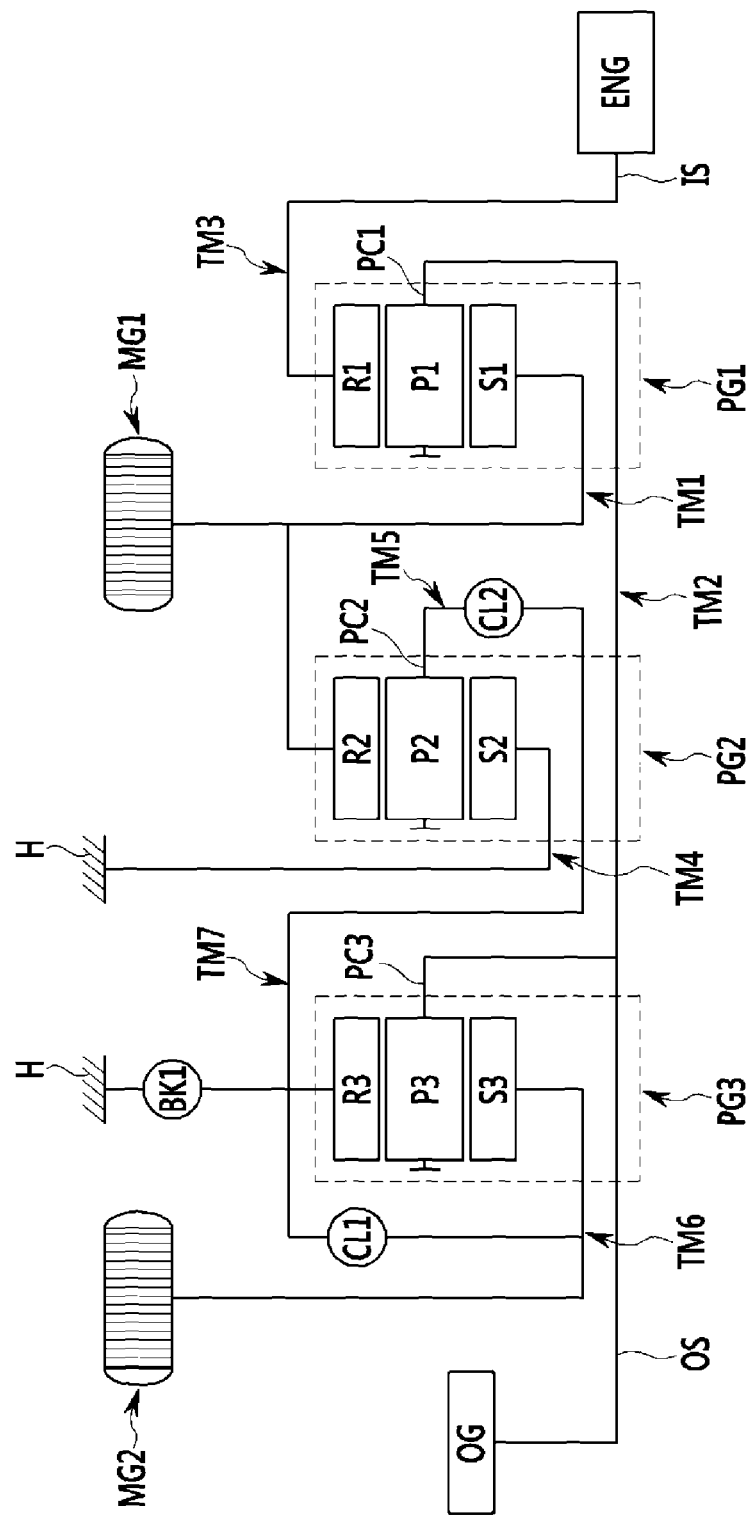
FIG. 3 is a configuration diagram of a power transmission system according to various exemplary embodiments of the present invention.

FIG. 3 is a configuration diagram of a power transmission system according to a second exemplary embodiment of the present invention.

Referring to FIG. 3, in the first exemplary embodiment, the first clutch CL1 which is the direct joining means of the third planetary gear set PG3 is disposed between the first rotational shaft TM2 and the seventh rotational shaft TM7, but in the second exemplary embodiment, the first clutch CL1 which is the direct joining means of the third planetary gear set PG3 is disposed between the sixth rotational shaft TM6 and the seventh rotational shaft TM7.

Since the second exemplary embodiment is different from the first exemplary embodiment only in a layout position of the first clutch CL1 and the second exemplary embodiment is the same as the first exemplary embodiment in an operation effect, a detailed description thereof will be omitted.

Figure 4:
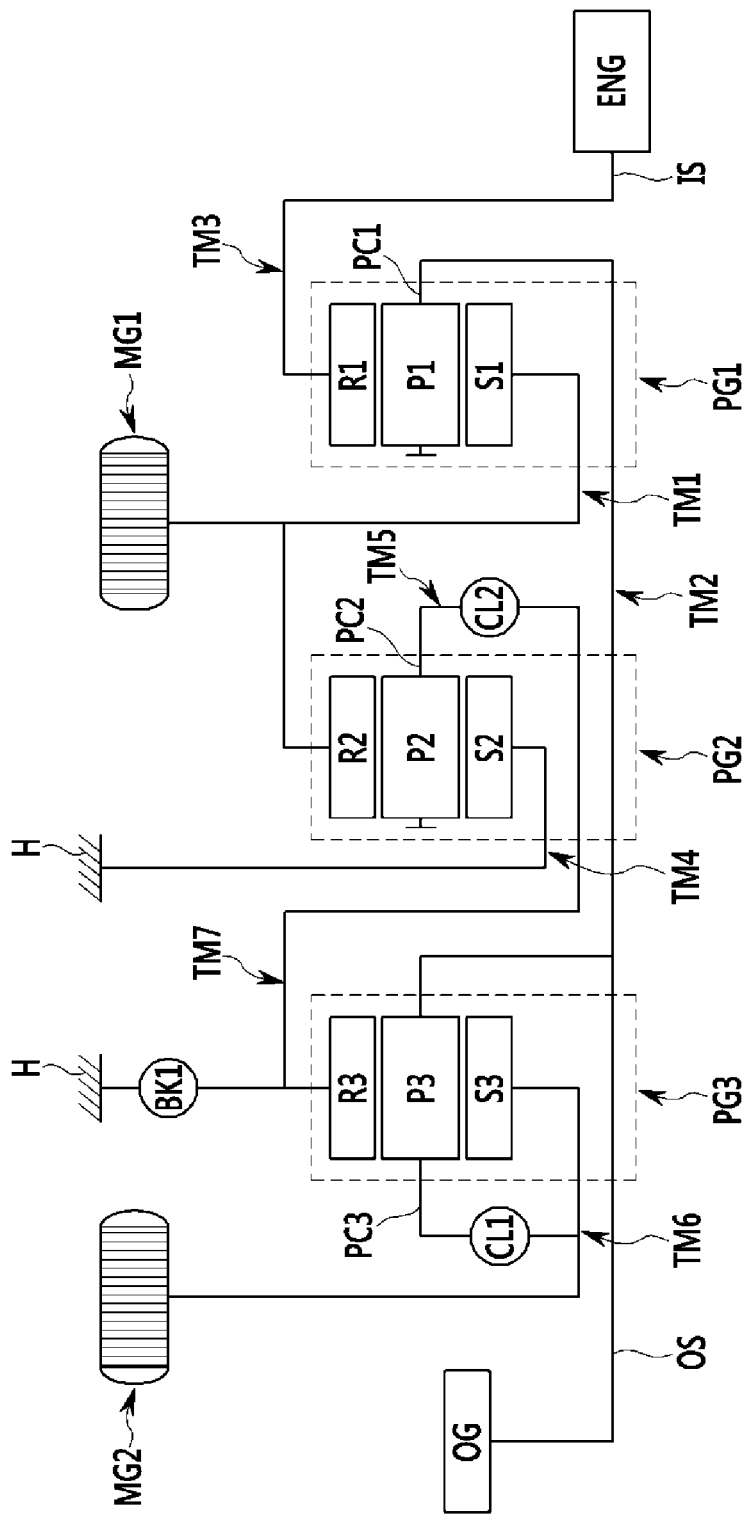
FIG. 4 is a configuration diagram of a power transmission system according to various exemplary embodiments of the present invention.

FIG. 4 is a configuration diagram of a power transmission system according to a third exemplary embodiment of the present invention.

Referring to FIG. 4, in the first exemplary embodiment, the first clutch CL1 which is the direct joining means of the third planetary gear set PG3 is disposed between the second rotational shaft TM2 and the seventh rotational shaft TM7, but in the second exemplary embodiment, the first clutch CL1 which is the direct joining means of the third planetary gear set PG3 is disposed between the second rotational shaft TM2 and the sixth rotational shaft TM6.

Since the third exemplary embodiment is different from the first exemplary embodiment only in the layout position of the first clutch CL1 and the second exemplary embodiment is the same as the first exemplary embodiment in the operation effect, a detailed description thereof will be omitted.

Figure 5:
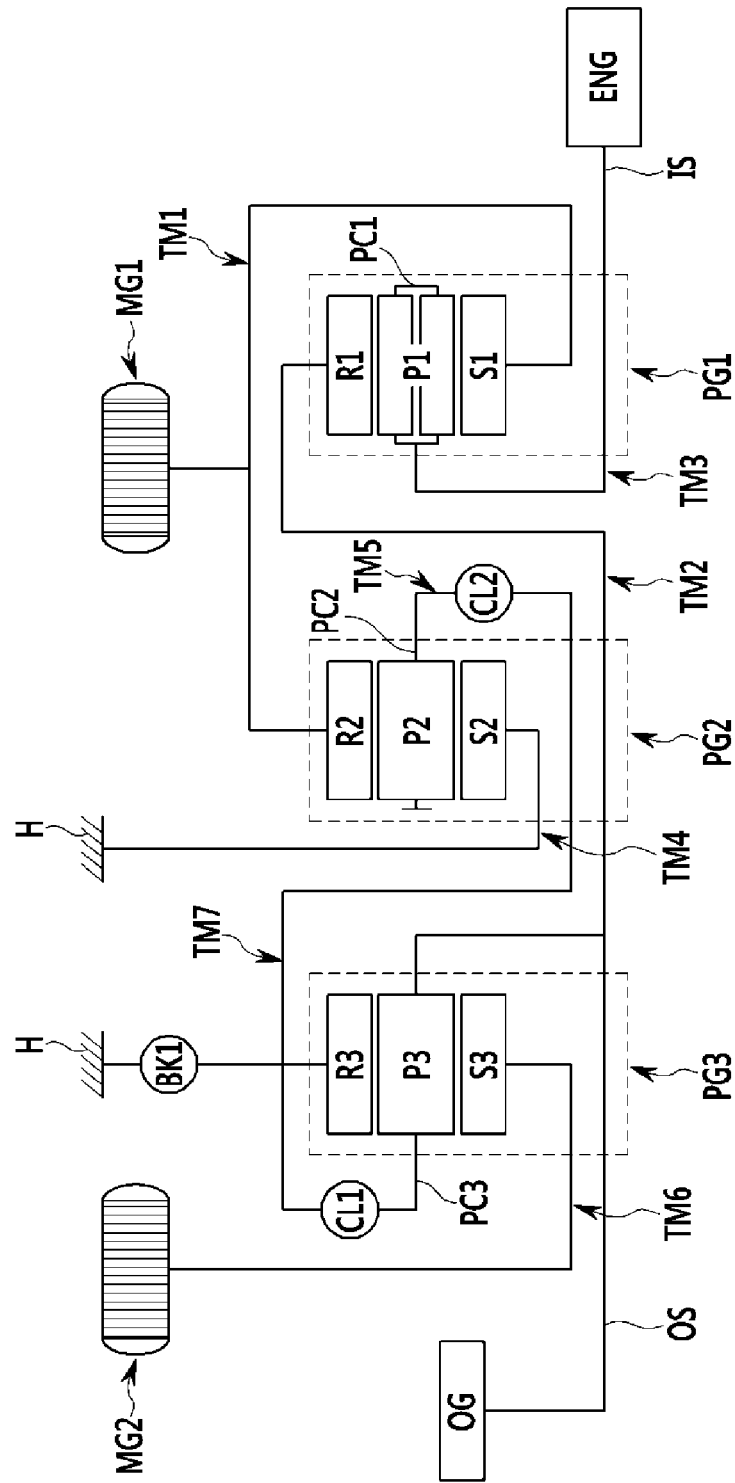
FIG. 5 is a configuration diagram of a power transmission system according to various exemplary embodiments of the present invention.

FIG. 5 is a configuration diagram of a power transmission system according to a fourth exemplary embodiment of the present invention.

Referring to FIG. 5, in the first exemplary embodiment, the first planetary gear set PG1 is configured by a single pinion planetary gear set, but in the fourth exemplary embodiment, the first planetary gear set PG1 is configured by a double-pinion planetary gear set.

As a result, the first rotational shaft TM1 related with the first planetary gear set PG1 is configured by connecting the first sun gear S1 and the second ring gear R2, the second rotational shaft TM2 is configured by connecting the first ring gear R1 and the third planetary carrier PC3, and the third rotational shaft TM3 is configured to include the first planetary carrier PC1.

Since the fourth exemplary embodiment is different from the first exemplary embodiment only in configurations of the second and third rotational shafts TM2 and TM3 and the fourth exemplary embodiment is the same as the first exemplary embodiment in the operation effect, a detailed description thereof will be omitted.

Figure 6:
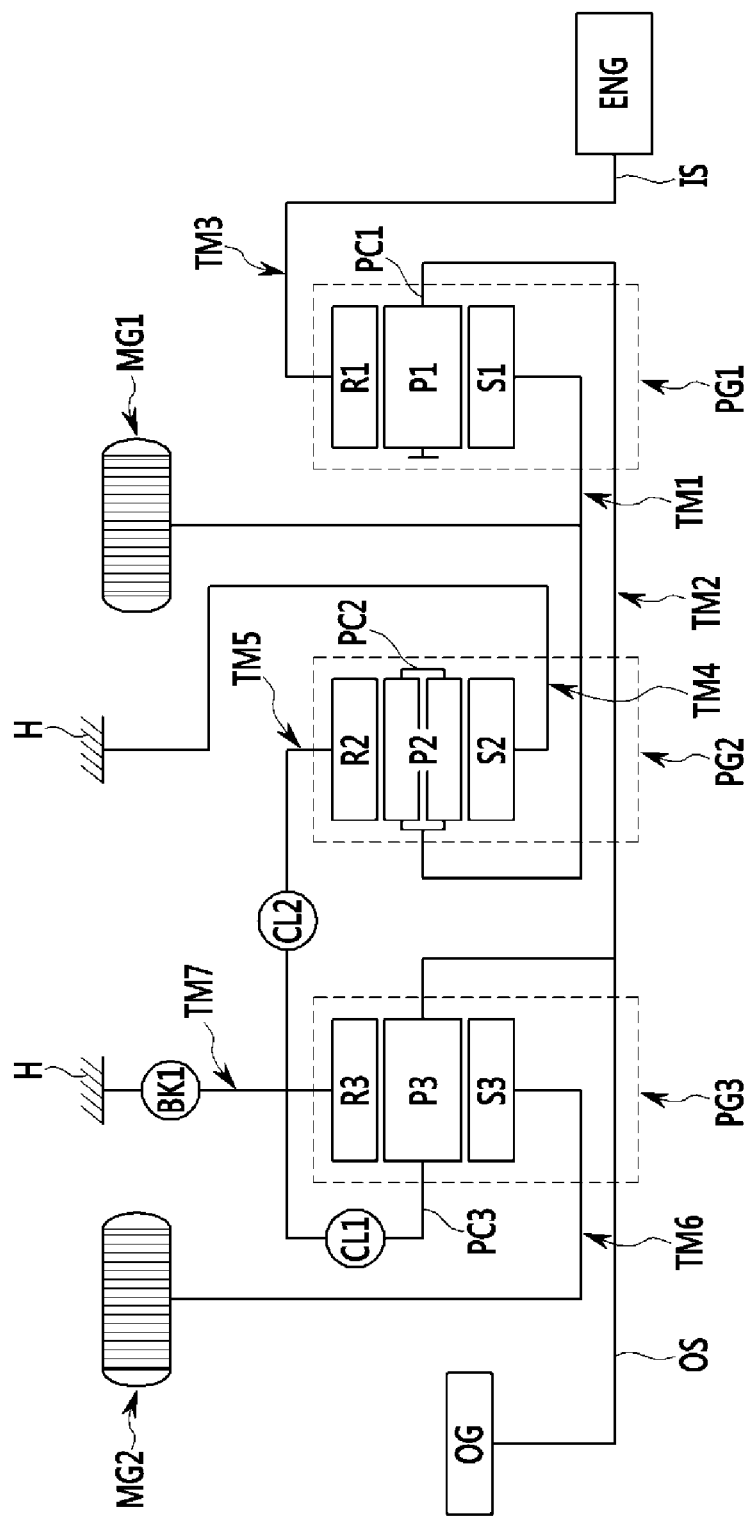
FIG. 6 is a configuration diagram of a power transmission system according to various exemplary embodiments of the present invention.

FIG. 6 is a configuration diagram of a power transmission system according to a fifth exemplary embodiment of the present invention.

Referring to FIG. 6, in the first exemplary embodiment, the second planetary gear set PG2 is configured by the single pinion planetary gear set, but in the fifth exemplary embodiment, the second planetary gear set PG2 is configured by the double-pinion planetary gear set.

As a result, the first rotational shaft TM1 related with the second planetary gear set PG2 is configured by connecting the first sun gear S1 and the second planetary carrier PC2, the fourth rotational shaft TM4 is configured to include the second sun gear S2, and the fifth rotational shaft TM5 is configured to include the second ring gear R2.

Since the fifth exemplary embodiment is different from the first exemplary embodiment only in configurations of the first and fifth rotational shafts TM1 and TM5 and the fifth exemplary embodiment is the same as the first exemplary embodiment in the operation effect, a detailed description thereof will be omitted.

Figure 7:
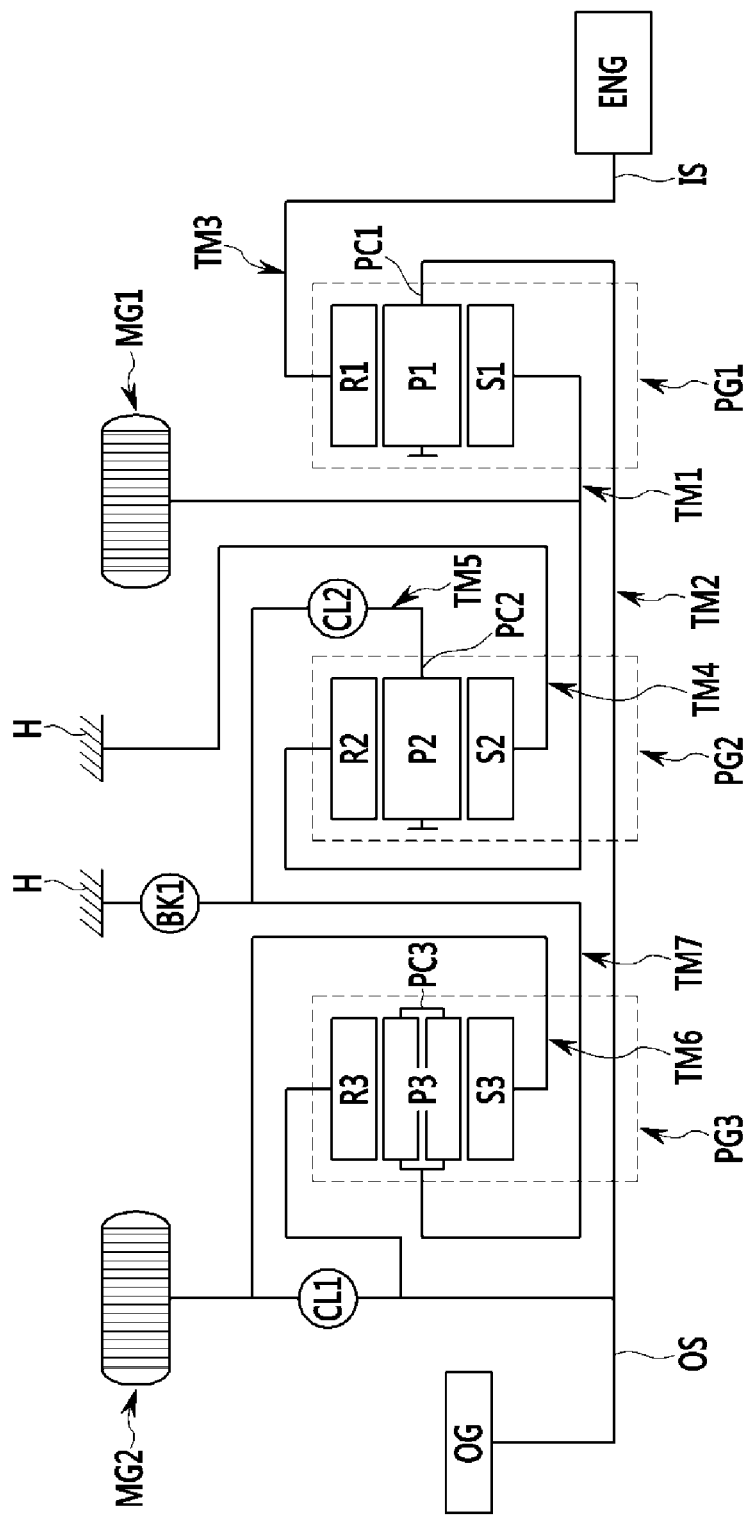
FIG. 7 is a configuration diagram of a power transmission system according to various exemplary embodiments of the present invention.

FIG. 7 is a configuration diagram of a power transmission system according to a sixth exemplary embodiment of the present invention.

Referring to FIG. 7, the third planetary gear set PG3 is configured by the single pinion planetary gear set in the first exemplary embodiment, but the third planetary gear set PG3 is configured by the double-pinion planetary gear set in the sixth exemplary embodiment.

As a result, the second rotational shaft TM2 related with the third planetary gear set PG3 is configured by connecting the first planetary carrier PC1 and the third ring gear R3, the sixth rotational shaft TM6 is configured to include the third sun gear S3, and the seventh rotational shaft TM7 is configured to include the third planetary carrier PC3.

Since the fifth exemplary embodiment is different from the first exemplary embodiment only in configurations of the second and seventh rotational shafts TM2 and TM7 and the fifth exemplary embodiment is the same as the first exemplary embodiment in the operation effect, a detailed description thereof will be omitted.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A power transmission system of a hybrid electric vehicle, comprising:
   an input shaft into which power of an engine is input;
   an output shaft outputting transmitted rotational power through an output gear;
   a first planetary gear set having three rotatable elements having a first sun gear, a first planetary carrier, and a first ring gear;
   a second planetary gear set having three rotatable elements having a second sun gear, a second planetary carrier, and a second ring gear;
   a third planetary gear set having three rotatable elements having a third sun gear, a third planetary carrier, and a third ring gear;
   a first shaft directly connected with a first motor/generator while directly connecting one rotatable element among the rotatable elements of the first planetary gear set and one rotatable element among the rotatable elements of the second planetary gear set;
   a second shaft directly connected with the output shaft while directly connecting another rotatable element of the first planetary gear set and one rotatable element among the rotatable elements of the third planetary gear set;
   a third shaft directly connecting a remaining rotatable element of the first planetary gear set and the input shaft;
   a fourth shaft directly connecting another rotatable element of the second planetary gear set with a transmission housing;
   a fifth shaft directly connected to a remaining rotatable element of the second planetary gear set;
   a sixth shaft directly connecting another rotatable element of the third planetary gear set and a second motor/generator; and
   a seventh shaft selectively connectable with the transmission housing while selectively connecting the one rotatable element of the third planetary gear set shaft.

2. The system of claim 1, wherein each of all of the first, second, and third planetary gear sets is a single pinion planetary gear set, and
   wherein the first shaft is directly connected with the first motor/generator while directly connecting the first sun gear and the second ring gear, the second shaft directly connects the first planetary carrier and the third planetary carrier, the third shaft directly connects the first ring gear and the input shaft, the fourth shaft directly connects the second sun gear to the transmission housing, the fifth shaft is directly connected to the second planetary carrier, the sixth shaft directly connects the third sun gear to the second motor/generator, and the seventh shaft is directly connected to the third ring gear.

3. The system of claim 1, further comprising:
   a first brake to selectively connect the seventh shaft with the transmission housing;
   a first clutch to selectively lock the third planetary gear set by selectively connecting the second shaft with the seventh shaft; and
   a second clutch to selectively connect the fifth shaft with the seventh shaft.

4. The system of claim 1, further comprising:
   a first brake selectively connecting the seventh shaft with the transmission housing;
   a first clutch to selectively lock the third planetary gear set by selectively connecting the sixth shaft with the seventh shaft; and
   a second clutch selectively connecting the fifth shaft with the seventh shaft.

5. The system of claim 1, further comprising:
   a first brake selectively connecting the seventh shaft with the transmission housing;
   a first clutch to selectively lock the third planetary gear set by selectively connecting the second shaft with the sixth shaft; and
   a second clutch selectively connecting the fifth shaft with the seventh shaft.

6. The system of claim 1, wherein the first planetary gear set is a double pinion planetary gear set, and each of the second and third planetary gear sets is a single pinion planetary gear set and has the first shaft directly connected with the first motor/generator while directly connecting the first sun gear and the second ring gear, the second shaft directly connecting the first ring gear and the third planetary carrier, the third shaft directly connecting the first planetary carrier and the input shaft, the fourth shaft directly connecting the second sun gear to the transmission housing, the fifth shaft including the second planetary carrier, the sixth shaft directly connecting the third sun gear to the second motor/generator, and the seventh shaft including the third ring gear.

7. The system of claim 1, wherein each of the first and third planetary gear sets is a single pinion planetary gear set, and the second planetary gear set is a double pinion planetary gear set and has the first shaft directly connected with the first motor/generator while directly connecting the first sun gear and the second planetary carrier, the second shaft directly connecting the first planetary carrier and the third planetary carrier, the third shaft directly connecting the first ring gear and the input shaft, the fourth shaft connecting the second sun gear to the transmission housing, the fifth shaft including the second ring gear, the sixth shaft directly connecting the third sun gear to the second motor/generator, and the seventh shaft including the third ring gear.

8. The system of claim 1, wherein each of the first and second planetary gear sets is a single pinion planetary gear set, and the third planetary gear set is a double pinion planetary gear set and has the first shaft directly connected with the first motor/generator while directly connecting the first sun gear and the second ring gear, the second shaft directly connecting the first planetary carrier and the third ring gear, the third shaft connecting the first ring gear and the input shaft, the fourth shaft directly connecting the second sun gear to the transmission housing, the fifth shaft including the second planetary carrier, the sixth shaft connecting the third sun gear to the second motor/generator, and the seventh shaft including the third planetary carrier.

9. A power transmission system of a hybrid electric vehicle, comprising:
   an input shaft into which power of an engine is input;
   an output shaft outputting transmitted rotational power through an output gear;

a first planetary gear set as a first single pinion planetary gear set having three rotatable elements including a first sun gear, a first planetary carrier, and a first ring gear;

a second planetary gear set as a second single pinion planetary gear set having three rotatable elements including a second sun gear, a second planetary carrier, and a second ring gear;

a third planetary gear set as a third single pinion planetary gear set having three rotatable elements including a third sun gear, a third planetary carrier, and a third ring;

a first shaft directly connected with a first motor/generator while directly connecting the first sun gear and the second ring gear;

a second shaft directly connecting the first planetary carrier and the third planetary carrier and directly connected with the output shaft;

a third shaft directly connecting the first ring gear and the input shaft;

a fourth shaft directly connecting the second sun gear to a transmission housing;

a fifth shaft directly connected to the second planetary carrier;

a sixth shaft directly connecting the third sun gear to the second motor/generator; and a seventh shaft directly connected to the third ring gear, and selectively connectable with the fifth shaft and selectively connectable with the transmission housing.

10. The system of claim 9, further comprising:
a first brake to selectively connect the seventh shaft with the transmission housing;
a first clutch to selectively lock the third planetary gear set by selectively connecting the second shaft with the seventh shaft; and
a second clutch to selectively connect the fifth shaft with the seventh shaft.

11. The system of claim 9, further comprising:
a first brake selectively connecting the seventh shaft with the transmission housing;
a first clutch to selectively lock the third planetary gear set by selectively connecting the sixth shaft with the seventh shaft; and
a second clutch selectively connecting the fifth shaft with the seventh shaft.

12. The system of claim 9, further comprising:
a first brake selectively connecting the seventh shaft with the transmission housing;
a first clutch to selectively lock the third planetary gear set by selectively connecting the second shaft with the sixth shaft; and
a second clutch selectively connecting the fifth shaft with the seventh shaft.

* * * * *